(12) United States Patent
Bellows

(10) Patent No.: US 9,087,247 B2
(45) Date of Patent: Jul. 21, 2015

(54) PASSIVE RFID TRIGGERING SYSTEMS AND METHODS USING ANTENNA REVERSE POWER DETECTION

(75) Inventor: David Bellows, Wantagh, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 837 days.

(21) Appl. No.: 12/689,482

(22) Filed: Jan. 19, 2010

(65) Prior Publication Data

US 2011/0175705 A1 Jul. 21, 2011

(51) Int. Cl.
*H04Q 5/22* (2006.01)
*G06K 7/10* (2006.01)

(52) U.S. Cl.
CPC ........ *G06K 7/10405* (2013.01); *G06K 7/10386* (2013.01); *G06K 7/10396* (2013.01)

(58) Field of Classification Search
CPC .......... G06K 7/10386; G06K 7/10405; G06K 7/10396
USPC ....................................................... 340/10.1
See application file for complete search history.

(56) References Cited

U.S. PATENT DOCUMENTS

| | | | |
|---|---|---|---|
| 3,794,992 A * | 2/1974 | Gehman | 342/28 |
| 5,196,846 A * | 3/1993 | Brockelsby et al. | 340/10.51 |
| 6,281,850 B1 * | 8/2001 | Klostermann | 343/702 |
| 7,711,154 B2 * | 5/2010 | Danielson et al. | 382/115 |
| 8,120,462 B2 * | 2/2012 | Shafer | 340/10.1 |
| 8,120,482 B2 * | 2/2012 | Ulrich | 340/539.22 |
| 2006/0044112 A1 * | 3/2006 | Bridgelall | 340/10.1 |
| 2007/0096919 A1 * | 5/2007 | Knadle et al. | 340/572.8 |
| 2007/0152892 A1 * | 7/2007 | Chiang et al. | 343/702 |
| 2007/0222609 A1 * | 9/2007 | Duron et al. | 340/572.7 |
| 2007/0222629 A1 * | 9/2007 | Yoneyama | 340/657 |
| 2008/0018327 A1 * | 1/2008 | Reynolds | 324/200 |
| 2009/0102663 A1 * | 4/2009 | Hillegass | 340/572.5 |
| 2009/0146783 A1 * | 6/2009 | Forster | 340/10.1 |
| 2010/0019906 A1 * | 1/2010 | Kushida et al. | 340/572.1 |
| 2010/0148931 A1 * | 6/2010 | Pappu et al. | 340/10.2 |
| 2010/0176999 A1 * | 7/2010 | Anguera et al. | 343/702 |
| 2010/0282849 A1 * | 11/2010 | Mair | 235/439 |

* cited by examiner

*Primary Examiner* — Naomi Small

(57) ABSTRACT

The present disclosure provides systems and methods for a truly passive trigger in a hands-free device, e.g. an RFID system. Specifically, the present invention includes a passive trigger antenna, an RFID reader system, and an associated passive triggering method. The passive trigger antenna may include any type of antenna solely for the purpose of reverse power detection, i.e. the passive trigger antenna is another antenna associated with the RFID reader system solely for detecting near field obstructions. The present invention utilizes detected near field obstructions as a passive trigger thereby eliminating manual activation of the system. In an exemplary embodiment, the present invention provides a passive trigger for a hands-free RFID system, such as a wearable RFID device. Advantageously, the passive trigger overcomes a requirement for a user to manually trigger a button or other activation mechanism for RFID reading thereby making the RFID system truly passive and hands-free.

6 Claims, 4 Drawing Sheets

PASSIVE RFID TRIGGERING SYSTEMS AND METHODS USING ANTENNA REVERSE POWER DETECTION

FIELD OF THE INVENTION

The present invention relates generally to radio frequency identification (RFID) systems and methods. More particularly, the present invention relates to passive RFID triggering systems and methods using antenna reverse power detection.

BACKGROUND OF THE INVENTION

RFID is the use of an object (typically referred to as an RFID tag) applied to or incorporated into a product, animal, person, or any device, object, etc. for the purpose of identification and tracking using radio waves. Some tags can be read from several meters away and beyond the line-of-sight of the reader. Conventionally, a significant number of RFID applications utilize hands-free devices. This may include a wearable RFID reader device that is configured to read tags on various objects, such as inventory, boxes, etc. For hands-free devices, especially those used for RFID, designing an effective trigger system is one of the most significant challenges. Conventional triggers are cumbersome, oversized, or awkward, which fundamentally contradicts the hands-free nature of the device. In addition, since RFID technology itself is inherently passive, the trigger for RFID hands-free devices should also be passive. However, conventional hands-free systems typically include an activation mechanism such as a trigger, button, etc. Because RFID itself is a passive technology that does not require line-of-sight from the reader to the tags, the number of actions the user needs to perform to accomplish the tasks at hand is minimized. If the RFID functionality needs to be activated by a discrete action by the user, such as pushing a button, the passive nature of the device is lost. There is therefore a need for a passive triggering system that requires no user intervention whatsoever to turn on and off RFID functionality in a hands-free system, resulting in a device that is 100% passive.

BRIEF SUMMARY OF THE INVENTION

In various exemplary embodiments, the present invention utilizes an antenna for monitoring RF power to detect near field obstructions. Specifically, the present invention may include a passive trigger antenna, an RFID reader system, and an associated passive triggering method. Advantageously, the present invention may be utilized with a wireless system, such as an RFID reader, to passively trigger an event, such as an RFID read operation. The passive trigger antenna may include any type of antenna solely for the purpose of reverse power detection, i.e. the passive trigger antenna is another antenna associated with the RFID reader system solely for detecting near field obstructions. The present invention utilizes detected near field obstructions as a passive trigger thereby eliminating manual activation of the RFID reader system. In an exemplary embodiment, the present invention provides a passive trigger for a hands-free RFID system, such as a wearable RFID device. Advantageously, the passive trigger overcomes a requirement for a user to manually trigger a button or other activation mechanism for RFID reading thereby making the RFID system truly passive and hands-free.

In an exemplary embodiment of the present invention, a passive trigger antenna system includes an antenna configured to transmit and receive radio frequency energy in a frequency band; and circuitry connected to the antenna, wherein the circuitry is configured to detect near field obstructions based on the power reflected back from the trigger antenna to the radio and to output a trigger based on detecting near field obstructions. The circuitry may detect the near field obstructions by monitoring one or more frequencies in the frequency band and detecting a change in return loss above a threshold at the one or more frequencies. Optionally, the one or more frequencies may include a resonant frequency in a radio frequency identification band. The threshold may be predetermined based upon characteristics associated with the antenna. The passive trigger antenna system may further include a radio frequency identification reader connected to the circuitry, wherein the radio frequency identification reader may be configured to operate responsive to the trigger. The radio frequency identification reader may include a housing with a radio frequency identification reader antenna; memory; input and output interfaces; and a processor; wherein each of the radio frequency identification reader antenna, the memory, the input and output interfaces, and the processor may be communicatively coupled to one another; and wherein the circuitry may be connected to or integrated within the processor. The radio frequency identification reader may include a hands-free, wearable system. The antenna may be smaller than the radio frequency identification reader antenna. Optionally, the antenna may be disposed within the housing. Alternatively, the antenna may be external to the housing. The passive trigger antenna system may further include a radio frequency identification reader connected to the circuitry, wherein the radio frequency identification reader is configured to operate continuously; and circuitry configured to capture data from the radio frequency identification reader, wherein the circuitry is configured to label the captured data responsive to the trigger. The antenna may be a miniaturized antenna with a very narrow banded return loss curve.

In another exemplary embodiment of the present invention, a method of passive triggering includes monitoring reverse power from an antenna with a device; detecting a reverse power change in the device, wherein the reverse power change is responsive to a near field obstruction; and outputting a trigger based on detecting the reverse power change. The method may further include operating the device for radio frequency identification applications, wherein the device is operated in proximity of objects being monitored in the radio frequency identification applications; and performing a radio frequency identification read based on the trigger. The method may further include setting a reverse power detection threshold, wherein the detecting step comprises detecting one or more frequencies crossing the reverse power detection threshold. The method may further include positioning the device on or near a user, wherein the reverse power change is responsive to an object being handled by the user.

In yet another exemplary embodiment of the present invention, a radio frequency identification system with passive triggering includes a passive trigger antenna; a radio frequency identification reader antenna; processing circuitry; and an interface communicatively coupling the passive trigger antenna, the radio frequency identification reader antenna, the memory, and the processing circuitry; wherein the radio frequency identification reader antenna is activated responsive to a trigger from the passive trigger antenna; and wherein the passive trigger antenna in conjunction with the processing circuitry is configured to detect near field obstructions based on the power reflected back from the trigger antenna to the radio and to output the trigger based on detecting near field obstructions. The passive trigger antenna in conjunction with the processing circuitry may detect the near field obstructions by monitoring one or more frequencies in a frequency band and detecting a change in return loss above a threshold at the one or more frequencies, and wherein the threshold may be predetermined based upon characteristics associated with the antenna. The radio frequency identification system may further include a housing containing the radio frequency identification reader antenna, the memory, and the processing circuitry; wherein the passive trigger antenna may be one of disposed within the housing, connected to the housing, or disposed on the housing; and wherein the radio frequency identification system may include a hands-free system whereby a user may wear or locate the radio frequency identification system in proximity of the user and pick up objects with a tag such that the objects are automatically read by the radio frequency identification reader antenna based on the trigger associated with the user picking up the objects.

BRIEF DESCRIPTION OF THE DRAWINGS

The present invention is illustrated and described herein with reference to the various drawings of exemplary embodiments, in which like reference numbers denote like method steps and/or system components, respectively, and in which:

FIG. 1 illustrates two graphs of return loss versus frequency showing frequency shifts based on near field obstructions as a mechanism for a passive trigger in an RFID system or the like;

DETAILED DESCRIPTION OF THE INVENTION

In various exemplary embodiments, the present invention provides unique systems and methods for a truly passive trigger in a hands-free wireless device. Specifically, the present invention may include a passive trigger antenna, an RFID reader system, and an associated passive triggering method. The passive trigger antenna may include any type of antenna solely for the purpose of reverse power detection, i.e. the passive trigger antenna is another antenna associated with the RFID reader system solely for detecting near field obstructions. The present invention utilizes detected near field obstructions as a passive trigger thereby eliminating manual activation of the RFID reader system. Alternatively, the passive trigger may be utilized for other purposes, such as labeling captured RFID data and the like. In an exemplary embodiment, the present invention provides a passive trigger for a hands-free RFID system, such as a wearable RFID device. Advantageously, the passive trigger overcomes a requirement for a user to manually trigger a button or other activation mechanism for RFID reading thereby making the RFID system truly passive and hands-free.

Figure 1:
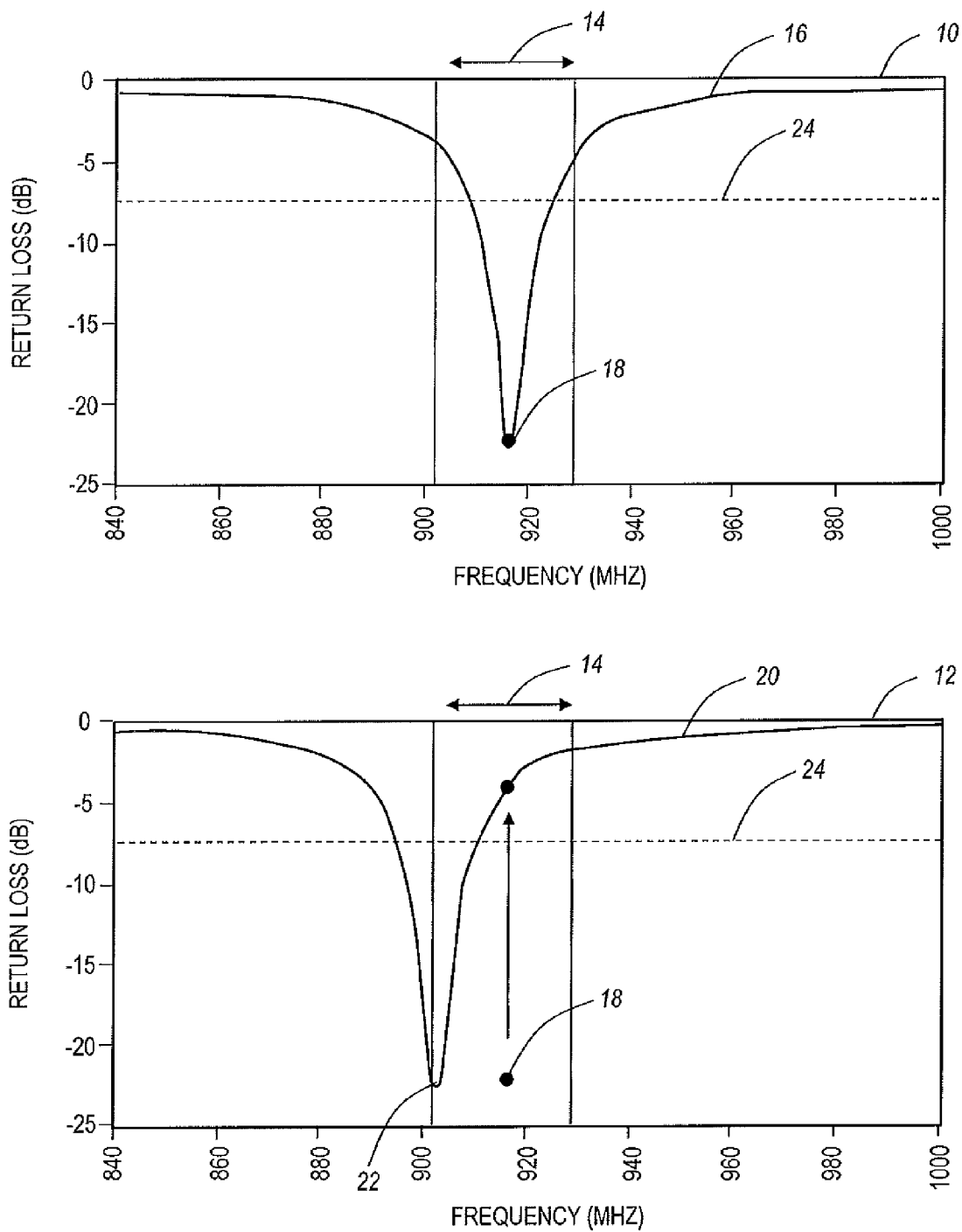

Referring to FIG. 1, in an exemplary embodiment, two graphs 10, 12 illustrate return loss versus frequency. Note that return loss is an alternate way of expressing voltage standing wave ratio (VSWR). All antennas are affected by their near field surroundings; in fact, antennas are intentionally tuned to function properly when in the presence of these known surroundings. However, problems may occur when other objects move into the near field of the antenna—these objects can inductively or capacitively load the antenna, shifting the resonant frequency up or down, respectively, effectively detuning the antenna and rendering it nonoperational in its intended band. The present invention takes advantage of this problem by turning it into a useful triggering mechanism. Each of the graphs 10, 12 illustrates return loss versus frequency for a passive trigger antenna of the present invention. In an exemplary embodiment, the passive trigger antenna may be utilized in hands-free RFID applications. RFID frequencies 14 typically range between about 902 MHz to 928 MHz in the U.S. Examples of hands-free RFID applications may include binning and truck unloading. The tasks for these applications center on physically picking up and putting down RFID tagged boxes or objects. If a user has to push a button to activate the RFID functionality or to signify a pick up or put down, the RFID system is no longer passive. In this scenario, if the user forgets to specifically push the trigger button, data will be lost, and the boxes of merchandise and the like will not be properly tracked. Moreover, the need for the user to physically push a trigger is time consuming and may be difficult while picking up and holding boxes. Of note, the process of a pick up or put down causes a near field obstruction that may be used by the passive trigger antenna in lieu of a manual trigger from the user.

The passive trigger antenna of the present invention may include any simple antenna design. This passive trigger antenna is included as part of an RFID system, such as, for example, a hands-free RFID system. The passive trigger antenna may be relatively small and be worn on the wrist or hand with the rest of the system. The passive trigger antenna will have a known return loss curve, which is a measure of the reverse power reflected back from the antenna to the radio. For example, the graph 10 illustrates an exemplary return loss curve 16 with a resonant frequency 18 located in the RFID frequencies 14. The graph 10 is an example where the passive trigger antenna is unobstructed thus the passive trigger antenna is not triggered. As the user's hand approaches a box to pick it up (or put it down), the box and its contents will enter (or leave) the antenna's near field and load it up, shifting its resonant frequency. The radio will detect this sudden change in reverse power, and this event can be used to trigger the RFID, signify a pick up or put down is taking place, etc. For example, the graph 12 illustrates an exemplary return loss curve 20 with a shifted resonant frequency 22. The graph 12 is from the same passive trigger antenna as the graph 10, but there is a near field obstruction such as a box in hand.

The present invention may include a triggering mechanism based upon the return loss curves 16, 20. In one exemplary embodiment, the present invention includes a reverse power detection threshold 24 that is a specific return loss value above which the passive trigger antenna may denote triggering (or below which may be another triggering). For example, in the graphs 10, 12, the reverse power detection threshold 24 is set at approximately −7.5 dB. Note, this value may be adjusted based on the specific antenna design and usage. Also, the reverse power detection threshold 24 may be set based upon which frequencies are monitored for triggering events. Here, for example, the resonant frequency 18 is monitored. In the graph 10, the resonant frequency 18 is well below −20 dB without near field obstructions. In the graph 12 as a near field obstruction is encountered, there is a shift in frequency (e.g. the return loss curves 16, 20 represent substantially the same curves with the curve 20 shifted in frequency from the curve 16 due to the obstruction). In the graph 12, the resonant frequency 18 jumps above the reverse power detection threshold 24, i.e. from below −20 dB to above −5 dB. The transition of a return loss value of the resonant frequency 18 from below the reverse power detection threshold 24 to above the reverse power detection threshold 24 may be a trigger event for the passive trigger antenna. Note, the present invention further contemplates utilizing any frequency, return loss value, threshold, etc., and the use of the resonant frequency 18 is merely for illustration purposes. Advantageously, this triggering method requires no additional steps from the user; the user just has to do a job of picking up and putting down boxes or other objects and the rest is automatically handled by the system with the passive trigger antenna.

Figure 2:
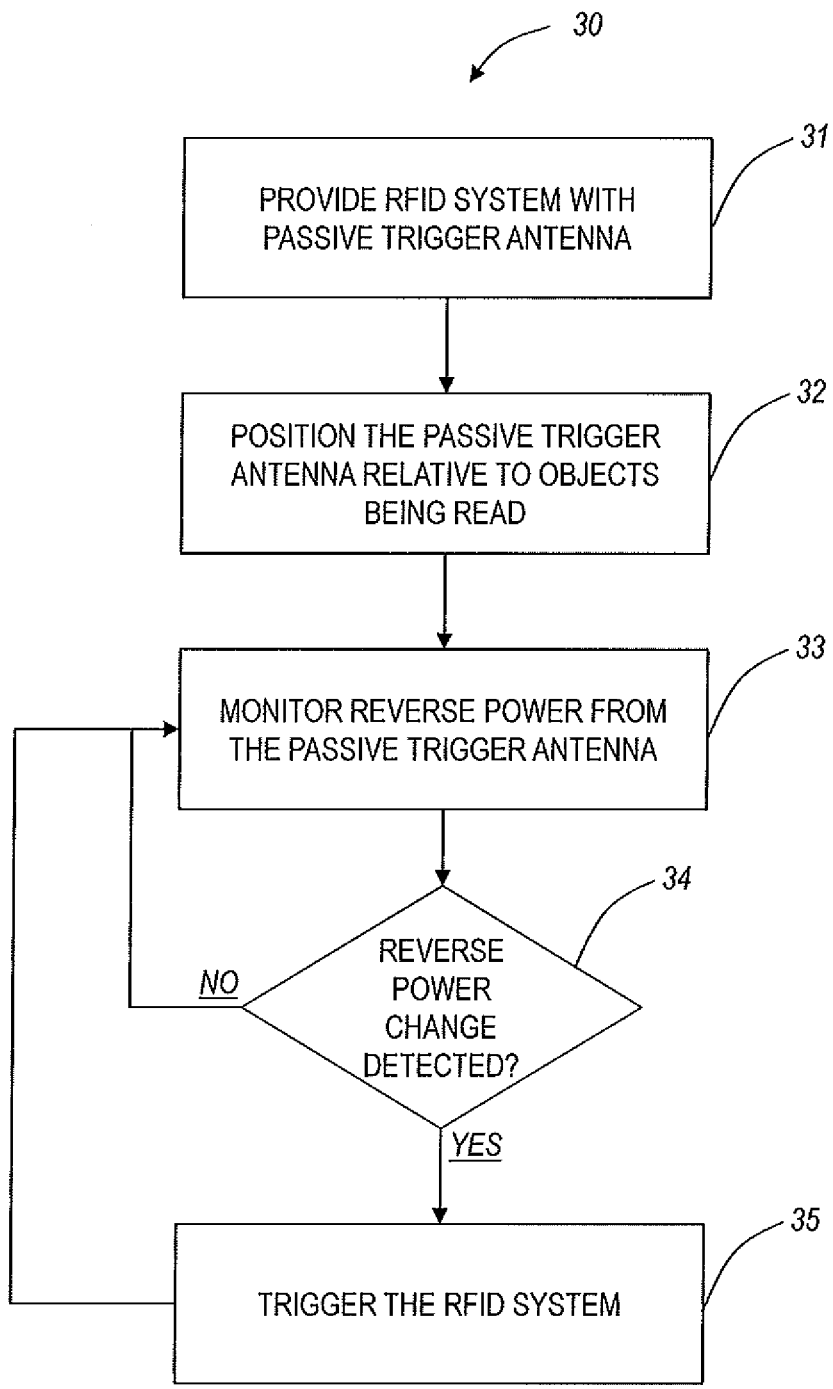
FIG. 2 illustrates a flowchart of an exemplary passive RFID triggering method using antenna reverse power detection as a passive trigger in an RFID system.

Referring to FIG. 2, in an exemplary embodiment, a flowchart illustrates a passive RFID triggering method 30 using antenna reverse power detection. The passive RFID triggering method 30 enables a user to operate an RFID system without requiring manual triggering to capture RFID data, such as, for example, with a hands-free RFID system. The passive RFID triggering method 30 starts with providing an RFID system with a passive trigger antenna (step 31). Exemplary RFID systems with a passive trigger antenna are illustrated in subsequent FIGS. 3-4. In general, the RFID system includes standard RFID components typically found in an RFID reader, a display unit, data storage, a communication mechanism, etc. along with a separate antenna that is used as a passive trigger, i.e. as described in FIG. 1. The passive trigger antenna is positioned relative to objects being read by the RFID triggering method 30 (step 32). As described in FIG. 1, the passive trigger antenna utilizes reverse power changes at specific frequencies to detect near field obstructions (and clearing of near field obstructions) thereby providing a triggering event. Here, in an exemplary embodiment, the passive trigger antenna is positioned relative to the objects being read. This may include a wearable device on a user's hand, finger, wrist, belt, and the like. Once positioned and activated, the passive RFID triggering method 30 monitors reverse power from the passive trigger antenna (step 33). If there is a change in reverse power detected (step 34), such as above a threshold or below a threshold, then the passive RFID triggering method 30 triggers the RFID system. This change in reverse power is described in FIG. 1.

Figure 3:
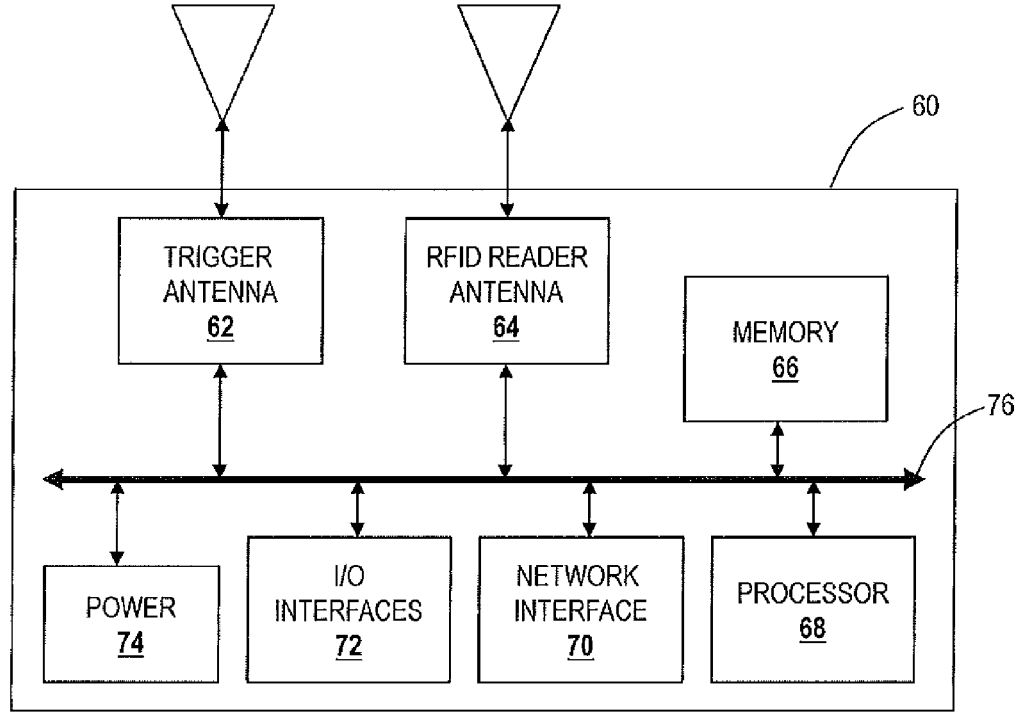
FIG. 3 illustrates a block diagram of an exemplary RFID system with a passive trigger antenna using antenna reverse power detection as a passive trigger.

Referring to FIG. 3, in an exemplary embodiment, a block diagram illustrates an RFID system 60 with a passive trigger antenna 62. In general, the RFID system 60 is configured to provide RFID tracking and the like. In an exemplary embodiment, the RFID system 60 may include, without limitation: the passive trigger antenna 62, an RFID reader antenna 64, memory 66, a processor 68, a network interface 70, input and output (I/O) interfaces 72, and a power source 74. The components (62, 64, 66, 68, 70, 72, and 74) may be communicatively coupled via a local interface 76. The local interface 76 may be, for example but not limited to, one or more buses or other wired or wireless connections, as is known in the art. The local interface 76 may have additional elements, which are omitted for simplicity, such as controllers, buffers (caches), drivers, repeaters, and receivers, among many others, to enable communications. Further, the local interface 76 may include address, control, and/or data connections to enable appropriate communications among the aforementioned components. It should be appreciated that FIG. 3 depicts the RFID system 60 in an oversimplified manner and a practical embodiment can include additional components and suitably configured processing logic to support known or conventional operating features that are not described in detail herein.

The trigger antenna 62 is configured to operate as a passive trigger as described herein. The trigger antenna 62 may be small compared to the RFID reader antenna 64. A typical RF tradeoff is antenna size versus bandwidth: the smaller the antenna, the narrower the bandwidth, which can result in undesirable RF performance. However, since the trigger antenna 62 is not actually being used to transmit and receive RF energy, size is not an issue here. In fact, a miniaturized antenna that has a very narrow banded return loss curve may be even more beneficial since a change in return loss is more evident in a narrow band antenna than in a broadband antenna. If there is a frequency shift in the return loss curve of a broadband antenna, the return loss value at the specific frequency being monitored will not change significantly if the frequency shift was not great enough to overcome the broad bandwidth of the antenna. However, for a narrow band antenna, the frequency shift that is needed to detect a noticeable change in return loss at a specific frequency is naturally much smaller. A narrow band antenna is therefore more sensitive and may be more appropriate for a trigger. When the reverse power at a frequency changes because the user has picked up a box or other object, the trigger may be automatically activated. In particular, the trigger antenna 62 may include any antenna design known in the art.

The RFID reader antenna 64 is configured to interrogate RFID tags. In an exemplary embodiment, the RFID system 60 contains intelligence and processing logic that facilitates centralized acquisition, control, and management of RFID data. Specifically, the RFID reader antenna 64 is configured to interrogate, i.e. transmit RF power to an RFID tag and to receive and store corresponding response data from the RFID tag. The RFID reader antenna 64 may be integrated within the RFID system 60, such as an integrated polarization orientation insensitive antenna. The present invention contemplates any implementation for the RFID reader antenna 64. In particular, the RFID system 60 includes circuitry and associated processing logic to trigger or turn on the RFID reader antenna 64 based on the trigger antenna 62. For example, responsive to a reverse power detection with the trigger antenna 62, the RFID reader antenna 64 may be configured to interrogate a tag.

The memory 66 can include any of volatile memory elements (e.g. random access memory (RAM, such as DRAM, SRAM, SDRAM, etc.)), nonvolatile memory elements (e.g. ROM, hard drive, tape, CDROM, etc.), and combinations thereof. Moreover, the memory 66 can incorporate electronic, magnetic, optical, and/or other types of storage media. Note that the memory 66 can have a distributed architecture, where various components are situated remotely from one another, but can be accessed by the processor 68. The processor 68 with the memory 66 generally represents the hardware, software, firmware, processing logic, and/or other components of the RFID system 60 that enable communication between the RFID system 60 and RFID tags, readers, and other network components to which the RFID system 60 communicates. The processor 66 can be any microprocessor, application specific integrated circuit (ASIC), field programmable gate array (FPGA), digital signal processor (DSP), any suitable programmable logic device, discrete gate or transistor logic, discrete hardware components, or combinations thereof that has the computing power capable of managing the antennas 62, 64 and the auxiliary components of the RFID system 60.

The network interfaces 70 may be used to enable the RFID system 60 to communicate on a network. The network interfaces 70 may include, for example, an Ethernet card (e.g. 10BaseT, Fast Ethernet, Gigabit Ethernet) or a wireless local area network (WLAN) card (e.g. 802.11a/b/g). The network interfaces 70 can include address, control, and/or data connections to enable appropriate communications on the network. Also, the network interfaces 70 may include a wireless antenna for communication over a service provider network. In an exemplary embodiment, the RFID system 60 may support one or more wireless data communication protocols. Any number of suitable wireless data communication protocols, techniques, or methodologies can be supported by RFID system 60, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; cellular/wireless/cordless telecommunication protocols; wireless home network communication protocols; paging network protocols; magnetic induction; satellite data communication protocols; wireless hospital or health care facility network protocols such as those operating in the WMTS bands; GPRS; and proprietary wireless data communication protocols such as variants of Wireless USB.

The I/O interfaces 72 may be used to receive user input from and/or for providing system output to one or more devices or components. User input may be provided via, for example, a keyboard, a mouse, a touch pad/screen, buttons, scroll bar, barcode reader, and the like. System output may be provided via a display device, a printer, portable memory (e.g. flash drives), and the like. I/O interfaces 72 may also include, for example, a serial port, a parallel port, a small computer system interface (SCSI), an infrared (IR) interface, a radio frequency (RF) interface, and/or a universal serial bus (USB) interface. Further, the RFID system 60 may include a suitable power source 74 such as an alternating current (AC) interface, direct current (DC) interface, power over Ethernet (PoE) compatible interface, or a repository for one or more disposable and/or rechargeable batteries. In an exemplary embodiment, the RFID system 60 is applicable to Motorola RFID reader hardware. For example, one particular RFID system 60 may include a radio that has two RF ports and a circular polarized antenna in a hands-free device. The circular polarized antenna only needs one of the two RF ports on the radio. Thus, the other port can therefore be used for the trigger antenna, taking advantage of the full potential of the radio.

Figure 4:
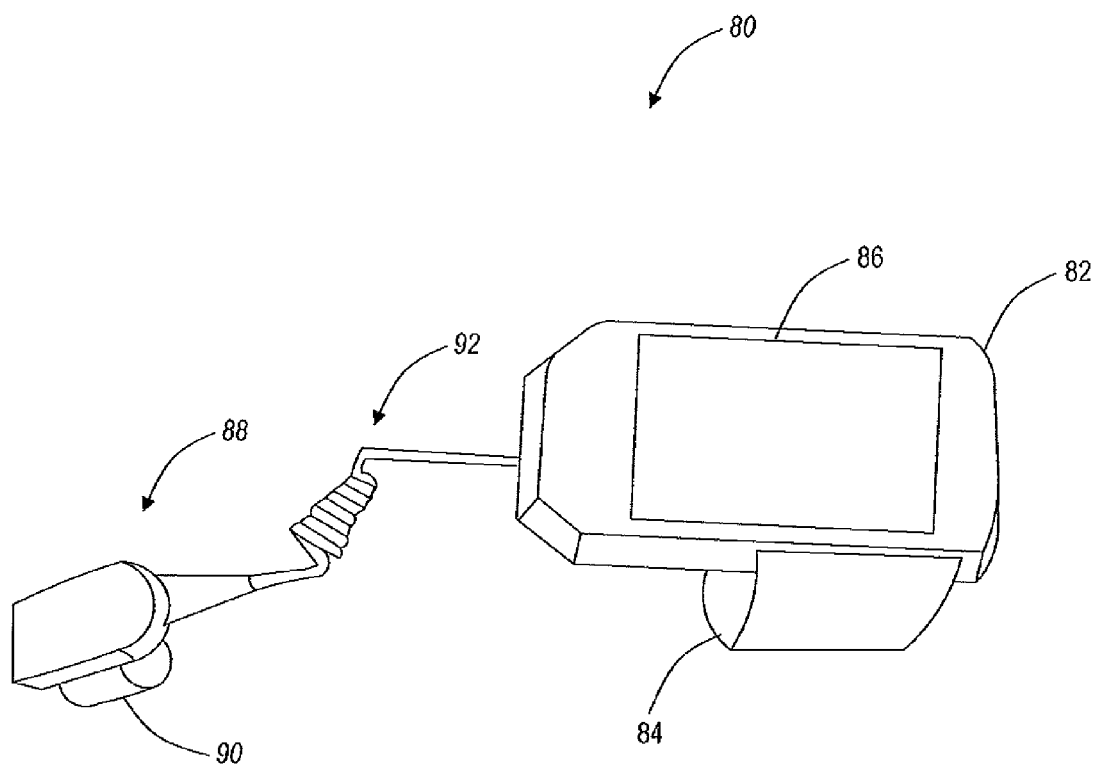
FIG. 4 illustrates a perspective view of an exemplary hands-free, wearable RFID system with a passive trigger antenna using antenna reverse power detection as a passive trigger.

Referring to FIG. 4, in an exemplary embodiment, a hands-free, wearable RFID system 80 is illustrated with a passive trigger antenna. As described herein, exemplary applications of the passive trigger antenna include a hands-free, wearable system, such as the RFID system 80. This may be worn and used by a user for binning, truck unloading, and the like. The RFID system 80 may include a reader housing 82 that is worn by the user. For example, the reader housing 82 may include an arm/wrist band 84 to attach the reader housing 82 to the user. Alternatively, the reader housing 82 may attach to a belt, around the user's waist, via a clip on a user's shirt, or the like. The reader housing 82 may include all of the various system components described in FIG. 3, such as a display 86. The RFID system 80 includes the passive trigger antenna described herein for activating a reader in the RFID system 80. In one exemplary embodiment, the passive trigger antenna may be disposed internally within or on a surface of the reader housing 82. In another exemplary embodiment, the passive trigger antenna may be disposed in a finger unit 88. Here, the finger unit 88 includes a strap 90 to attach to the user's finger, e.g. the reader housing 82 may be then attached to the user's wrist and connected to the finger unit 88 via a cable 92. Conventional systems akin to the hands-free, wearable RFID system 80 typically include a button or the like on the finger unit 88 whereby the user activates the button as required to signal the reader housing 82 to read an object, e.g. as boxes, etc. are picked up, binned, etc. However, the passive trigger antenna described herein eliminates this requirement allowing the RFID system 80 to operate completely hands-free in a 100% passive mode.

Referring to back to FIG. 2, the bulk of the exemplary applications described herein outline a scenario of using the trigger data to turn on and off the RFID functionality itself. However, there may be applications and users who prefer to leave RFID on continuously in an interrogation mode. A drawback of doing this however is not having any meaning to the continuous data stream that is collected. The company will have a list of tags that were read, but in the case of a binning application where items are either picked from the inventory shelves to be brought to the retail floor for replenishment or put on the inventory shelves to refill the backroom stock, the company will not have any insight as to whether items were picked, put, or neither; there is no context for the data. So, in this type of scenario, the trigger could be used not to simply turn on/off the RFID but instead label the data to note what action/event to associate with the data. In an exemplary embodiment, a "pick" example using the trigger to label data as opposed to turning on/off RFID functionality may be illustrated as follows. Assume a user utilizes the present invention with the passive trigger antenna, and the user is walking down the aisle of a back room, etc., with the RFID on continuously. Everything within several feet is being read as the user passes items on the shelves. All this data is extraneous for the binning application (but might be useful for general inventory applications). Assume, the user approaches a specific location on a specific shelf, and extends his/her hands to pick up a box. The presence of the box near the trigger antenna changes the reverse power thereby activating the trigger. At the same time, the RFID antenna reads the tag on the box and the shelf location tag. As the user walks away from the shelf with the box, the box tag is still read with the trigger still activated, but the shelf tag is now out of range. Since the trigger was activated and the shelf tag was read in the beginning of the event, the system may label this data as a "pick," i.e. this item has been removed from the shelf. A similar scenario for a "put" event may be utilized as well. Specifically, the present invention contemplates the trigger from the trigger antenna for a variety of applications including, but not limited to, activating RFID functionality, labeling concurrent data, and the like.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A method of passive triggering, comprising:
providing a passive trigger antenna and a separate radio frequency identification (RFID) reader antenna;
setting a return loss detection threshold for the passive trigger antenna;
monitoring reverse power reflected at a frequency from the passive antenna;
detecting a change in return loss value at the monitored frequency, wherein the return loss value change is responsive to a near field obstruction shifting a resonant frequency of the passive antenna away from the monitored frequency to change the return loss value of the amount of power reflected back from the passive trigger antenna to the device at the monitored frequency crossing above the return loss detection threshold; and outputting a trigger, based on detecting the return loss value crossing above the return loss detection threshold, for a radio frequency identification (RFID) reader to use to trigger an interrogation of an RFID tag using the separate RFID reader antenna.

2. The method of claim 1, further comprising:
operating the device in proximity of objects being interrogated by the RFID reader.

3. The method of claim 1, further comprising:
positioning the device on or near a user, wherein the return loss value change is responsive to an object being handled by the user to cause the near field obstruction.

4. A radio frequency identification system with passive triggering, comprising:
   a passive trigger antenna configured to reflect radio frequency energy;
   a separate radio frequency identification (RFID) reader antenna;
   processing circuitry configured to provide the radio frequency energy to the passive trigger antenna, and monitor a reverse power reflected back from the passive trigger antenna at a frequency; and
   an interface communicatively coupling the passive trigger antenna, the radio frequency identification reader antenna, and the processing circuitry;
   wherein the passive trigger antenna in conjunction with the processing circuitry is configured to detect near field obstructions based on the near field obstructions shifting a resonant frequency of the passive trigger antenna away from the monitored frequency to change a return loss value in the amount of power reflected back from the passive trigger antenna to the processing circuitry at the monitored frequency, and to output a trigger, based on the change of return loss value above a return loss threshold at the monitored frequency, for a RFID reader to use to trigger an interrogation of an RFID tag using the RFID reader antenna.

5. The radio frequency identification system of claim 4, wherein the detection of the near field obstructions renders the passive antenna nonoperational in the RFID reader operational frequency band.

6. The radio frequency identification system of claim 4, wherein the passive trigger antenna is provided with a known return loss curve, and has a narrower bandwidth than the RFID reader antenna.

* * * * *